United States Patent [19]

Herwig

[11] Patent Number: 4,458,471
[45] Date of Patent: Jul. 10, 1984

[54] COMBINE SPEED CONTROL
[75] Inventor: Warren E. Herwig, Wind Lake, Wis.
[73] Assignee: Allis-Chalmers Corp., Milwaukee, Wis.
[21] Appl. No.: 336,258
[22] Filed: Dec. 31, 1981
[51] Int. Cl.³ .............................................. A01D 69/00
[52] U.S. Cl. ................................ 56/10.2; 56/DIG. 15
[58] Field of Search ......................... 56/10.2, DIG. 15
[56] References Cited

U.S. PATENT DOCUMENTS

| | | | |
|---|---|---|---|
| 2,639,569 | 5/1953 | Pasturczak | 56/10.2 |
| 3,073,099 | 1/1963 | Andersen | 56/10.2 |
| 3,514,929 | 6/1970 | Cornish et al. | 56/10.2 |
| 4,130,980 | 12/1978 | Fardal et al. | 56/10.2 |
| 4,136,508 | 1/1979 | Coleman et al. | 56/10.2 |

FOREIGN PATENT DOCUMENTS

| | | | |
|---|---|---|---|
| 221409 | 9/1968 | U.S.S.R. | 56/10.2 |
| 745417 | 7/1980 | U.S.S.R. | 56/10.2 |
| 858640 | 8/1981 | U.S.S.R. | 56/10.2 |

Primary Examiner—Gene Mancene
Assistant Examiner—David I. Tarnoff
Attorney, Agent, or Firm—Lee H. Kaiser

[57] ABSTRACT

A ground speed control for an agricultural combine driven by a turbocharged engine through a variable transmission continuously monitors a plurality of speed and load parameters of the combine and engine, identifies the controlling parameter representing the limiting capacity in the harvesting process as field conditions change, and varies combine ground speed in response to such controlling parameter to maximize the harvest cutting rate. Sensors monitor ground speed, boost pressure and engine speed parameters and convert them to electrical signals which are compared to boost pressure and ground speed setpoint signals selected by the operator and to a fixed engine speed setpoint signal to derive error signals for such parameters. Voltage level sensitive OR-means and AND-means establish deadbands for the error signals having upper and lower limits on opposite sides of the corresponding setpoint signals. The OR-means generates a speed decrease signal to decrease the transmission drive ratio and slow down the combine when any positive error signal is beyond its upper deadband limit. The AND-means generates a speed increase signal to increase the transmission drive ratio when both boost pressure and ground speed negative error signals are beyond their lower deadband limits. The speed increase and speed decrease signals are modulated by a rate of response signal which is a function of the magnitude of the parameter error signals so that the control both identifies and responds to the controlling parameter which has the greatest error and also responds at a rate which is a function of the magnitude of such error.

26 Claims, 2 Drawing Figures

COMBINE SPEED CONTROL

This invention relates to a ground speed control for an agricultural harvesting-threshing vehicle such as a combine and more particularly to a control system which automatically adjusts operation of a combine in accordance with crop conditions to maintain the desired ground speed and engine load parameters set by the combine operator.

BACKGROUND OF THE INVENTION

In an agricultural harvesting-threshing vehicle such as a combine, the harvested crop is conventionally acted upon by a series of crop-processing mechanisms such as a threshing cylinder and cooperating concave, straw walkers, a shaker shoe, etc., and the combine operates most efficiently when such crop-processing mechanisms are continuously supplied with a predetermined load of crop material. If too much crop material is being supplied, such crop-processing mechanisms become overloaded. If too little crop material is supplied, the combine is not working up to capacity. Overloading of the threshing cylinder, the straw walkers and the shaker shoe results in higher loss of grain.

Combines are often provided with an infinitely variable transmission and manual means for selectively controlling the transmission ratio, and thus combine ground speed, so that the operator may adjust the amount of crop material supplied to the crop-processing mechanisms in accordance with crop conditions, i.e., to permit reducing ground speed, and thus reduce the amount of crop material supplied, when moving into a region of dense crop and increasing ground speed, and thus increase the amount of crop material supplied, when the crop is relatively thin.

Combine speed controls are also known for automatically adjusting combine ground speed. In the control of U.S. Pat. No. 3,073,099 to Anderson, the drive train between the engine and the ground wheels includes a variable diameter pulley, and the transmission ratio is controlled in response to the output of a device which senses the volume rate of flow of crop material into the combine. In U.S. Pat. No. 3,442,068 to Bulin, the instantaneous crop load is automatically monitored by sensing variations in the separation between a threshing cylinder and its associated concave and translating such variations into opening and closing of a shunt valve which bleeds pressure from a hydraulic device that controls combine ground speed. The combine ground speed control of U.S. Pat. No. 3,481,122 to Pool et al senses both the torque required to feed the crop material into the harvester and the torque required to process the crop material and regulates combine ground speed in response to the algebraic sum of such measured torques. U.S. Pat. No. 3,514,929 to Cornish et al discloses an electronic control system for a combine in which a torque sensing transducer in the drive shaft for the grain harvesting header generates an electrical feed rate signal proportional to the torque in the header drive, and such feed rate signal is combined with a feed rate reference signal that is compared, in turn, with a velocity setpoint signal and a velocity signal from a transmission transducer, the sum of said signals being used to control an infinitely variable transmission.

In the automatic speed control for a combine disclosed in U.S. Pat. No. 4,130,980 to Fardal et al, the torques applied to the threshing cylinder drive shaft and to the crop feeding drive shaft are sensed by idler pulleys which engage the tight side of drive belts for such shafts and actuate potentiometers that generate electrical signals which control a hydrostatic drive system for the combine drive wheels so that ground speed is regulated in response to measurement of the power required to drive the threshing cylinder and also the power required to drive the crop cutting and conveying mechanisms.

One disadvantage of certain of such prior art automatic combine speed control systems is that they respond to only a single variable and can result in sharp changes in ground speed since the torque required (or load measured) at one point is neither anticipated nor remembered. Another fault of such speed control systems based on grain loss input functions is that their response time is slower than that of the operator due to the material transport time required to move the crop through the combine. A time period of up to twenty-five seconds may be required to transport the crop through the combine, and in twenty-five seconds the combine may have encountered crop conditions where the ground speed is sufficiently high to push the crop over and stall the engine. The combine operator can react quicker than such transport time and manually adjust combine ground speed to compensate for such change of crop conditions before the automatic control responds. Further, in prior art automatic combine speed controls wherein load or torque is monitored by an idler pulley on the tight side of a drive belt, calibration is very sensitive and necessitates that the power sensing mechanism be zeroed frequently in the field.

SUMMARY OF THE INVENTION

The combine ground speed control of the invention regulates ground speed based upon a plurality of parameters and automatically identifies the controlling parameter as the limiting capacity in the harvesting process. The ground speed control continuously monitors all parameters, automatically chooses the parameter representing the limiting condition as field conditions change, and varies combine ground speed in response to the chosen parameter and to its magnitude to maximize the harvest cutting rate.

In a preferred embodiment, the continuously monitored parameters are ground speed, engine speed and boost pressure of the turbocharger drive engine, the latter being an indication of horsepower produced by the engine. Combine ground speed becomes a limiting parameter during harvesting when it exceeds the rate at which the sickle bar cutter can cut the crop with the result that the crop is pushed over and lost. Turbocharger boost pressure becomes the limiting parameter when the load on the engine from the harvesting process exceeds the available horsepower. Engine speed limits harvesting rates when the engine falls out of the governed range and begins to stall. Such limiting parameters are converted by transducers to electric signals, and the ground speed and boost pressure signals are compared to ground speed and boost pressure setpoint signals selected by the combine operator to derive ground speed and boost pressure error signals.

If either the "+" ground speed error signal or the "+" boost pressure error signal is beyond its upper deadband limit or the engine speed falls below the lower limit of the governed range, the dominant error signal is selected by OR-means to derive a vehicle "speed decrease" or "slower" signal. The magnitude of such dominant error, or "speed decrease" signal is preferably varied in proportion to a weighted sum of the error signals, and the resultant signal actuates the swash plate of the hydrostatic transmission of the combine drive to slow the vehicle and decrease the dominant error "speed decrease" signal to zero when the dominant error is returned within its bandwidth limits.

If all of the "−" error signals are below their lower deadband limits, thereby indicating that both ground speed and boost pressure are too low, AND means derives a "speed increase," or "faster" signal whose magnitude is varied in proportion to a weighted sum of the error signals, and the resultant signal actuates the swash plate of the hydrostatic transmission to speed up the vehicle, thereby bringing the error signals within their deadbands and operating the vehicle at higher speed and optimum capacity.

The control establishes ground speed and boost pressure deadbands within whose upper and lower limits no changes are made in the setting of the hydrostatic transmission when combine ground speed and boost pressure and close to the values selected by the combine operator and engine speed is within the governed range. The control also permits operation of the turbocharger engine at some point below maximum boost pressure with engine speed above rated speed where the crop-processing mechanisms are being supplied with the predetermined critical crop load for efficient operation and which leaves enough power reserve for momentary higher loads and allows for maximizing performance without having to repeatedly reduce ground speed to allow the engine to recover from overloads.

DETAILED DESCRIPTION OF THE PREFERRED EMBODIMENT

Figure 1:
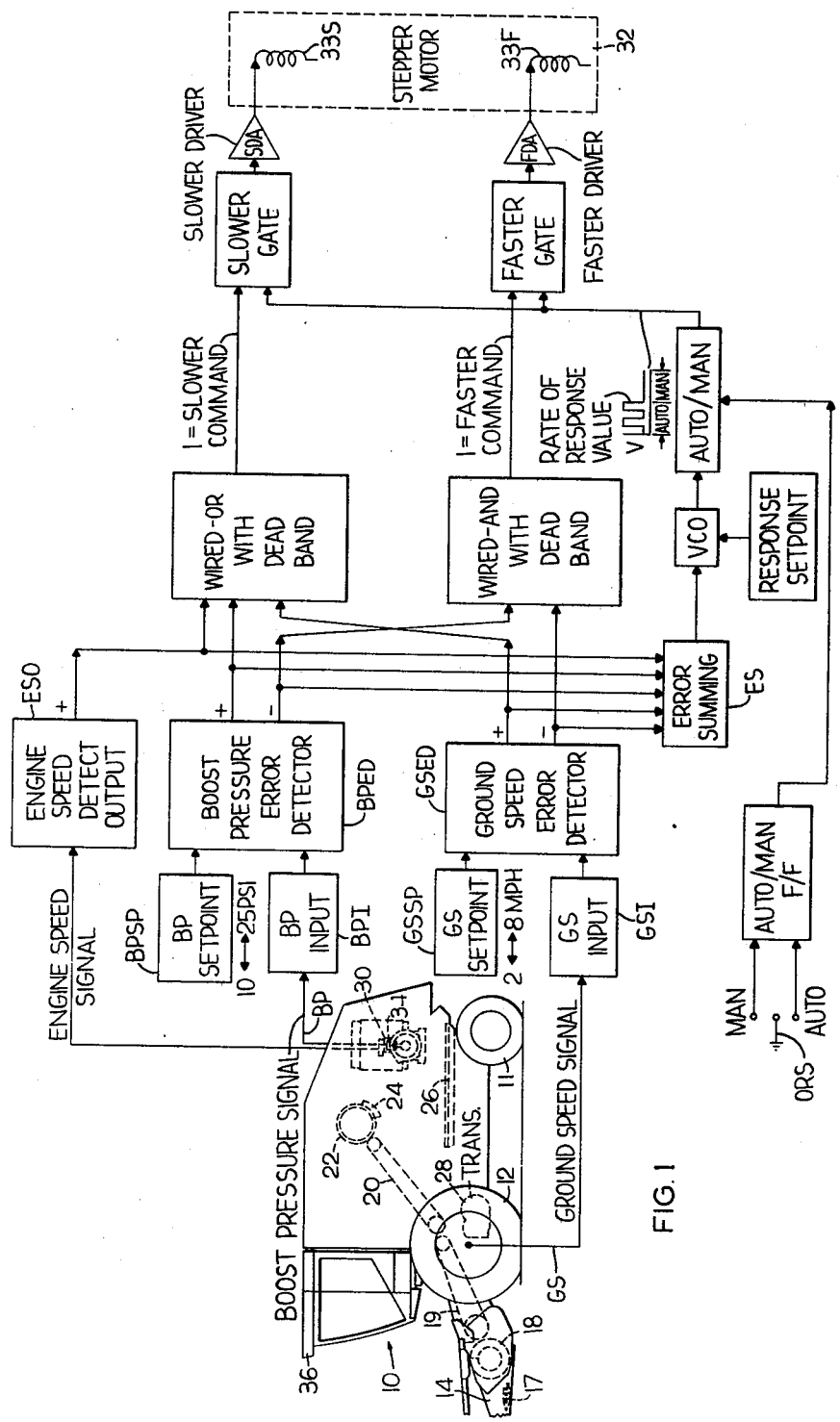
FIG. 1 is a block diagram of the combine speed control of the invention.

An agricultural harvester-thresher combine vehicle 10 embodying the invention illustrated in FIG. 1 of the drawing is provided with steering wheels 11 and drive wheels 12 which propel the vehicle in the forward direction so that crop may be cut and collected by a cut-crop receiving header 14 which may include such crop-processing mechanisms as a sickle bar 17 that cuts the standing crop, a transverse rotatable auger 18, a lower elevator conveyor 19 and an upper elevator conveyor 20 which transport the cut crop upwardly and rearwardly to a rotating threshing cylinder 22 which moves the crop between it and its associated concave 24 to separate the grain from the straw. Combine 10 may also have a vibratory cleaning shoe 26 for cleaning the separated grain.

For propelling the combine vehicle 10 over the ground, a variable hydrostatic transmission 28, shown only in box form, is coupled between a supercharged engine 30, which preferably is of the turbocharger type, and drive wheels 12. A stepper motor 32 for changing the swash plate position of hydrostatic transmission 28 to vary its drive ratio includes a faster solenoid winding 33F which, when energized, increases the drive ratio of transmission 28 to make combine 10 travel faster and a slower solenoid winding 33S which, when energized, decreases the transmission drive ratio to slow the forward speed of combine 10. Turbocharger engine 30 also drives the crop-processing and conveying mechanisms such as sickle bar 17, auger 18, lower and upper elevator conveyors 19 and 20, threshing cylinders 22 and cleaning shoe 26 in conventional manner, and the conventional drive trains between engine 30 and such crop-processing mechanisms are omitted from the drawing in order to simplify the description and facilitate understanding of the invention.

The ground speed control of the invention continuously monitors a plurality of parameters within the combine, automatically chooses the parameter which limits the capacity in the harvesting process, and varies combine ground speed in response to the chosen parameter and its magnitude to maximize the harvesting rate. In the preferred embodiment illustrated in FIG. 1 of the drawing, the parameters which are continuously monitored are ground speed of the drive wheels 12, speed of drive engine 30, and boost pressure of engine 30, which is indicative of the horsepower produced by the engine.

Figure 2:
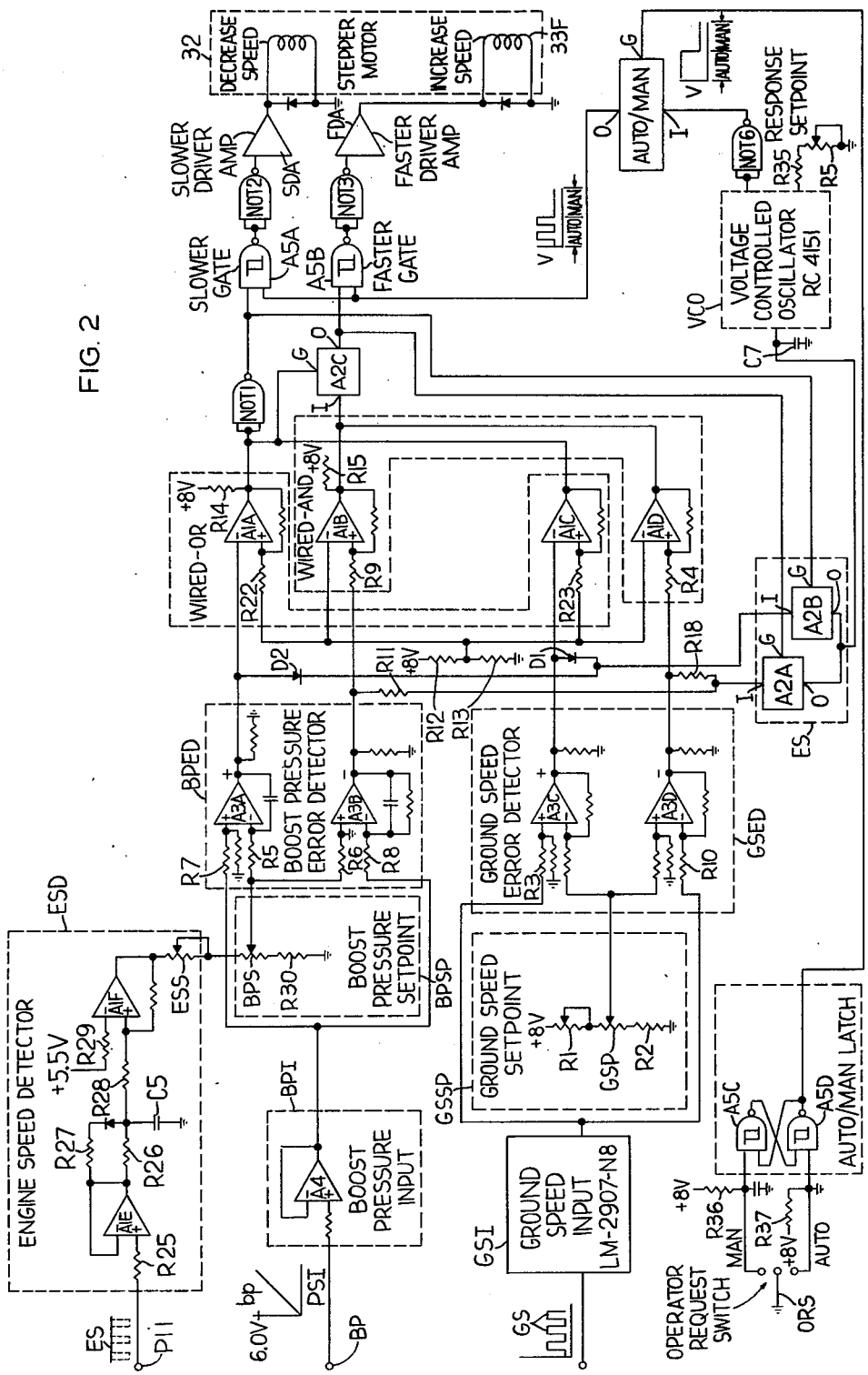
FIG. 2 is a schematic circuit of the FIG. 1 block diagram.

An electrical ground speed signal is generated by a reluctance type transducer, or tachometer (not shown) associated with transmission 28 which generates square wave pulses GS-FIG. 2 at a frequency proportional to the rpm of a rotating element within transmission 28, and thus to the rpm of drive wheels 12. The variable frequency ground speed pulses GS are applied to a ground speed input circuit GSI which may be a integrated circuit of the LM-2907-N8 type commercially available from National Semiconductor, Inc. and converts the square wave input pulses GS into a unidirectional ground speed analog signal whose magnitude is proportional to the frequency of input pulses GS.

A boost pressure transducer (not shown) senses boost pressure of air introduced into the cylinders 34 of turbocharger engine 30 and generates an electrical unidirectional boost pressure signal which is transmitted over an input conductor designated BP and whose magnitude varies linearly with boost pressure over a range from 0 to 6 volts with variations of boost pressure from 0 to 27.5 p.s.i. as schematically illustrated by the straight line plot bp of a graph of boost pressure versus voltage The unidirectional boost pressure signal is amplified in a voltage follower amplifier A4 of boost pressure input circuit BPI.

Under various field or harvesting conditions, the three parameters of ground speed, engine speed, and engine boost pressure become operating limits at different times. Ground speed becomes a limiting factor when it exceeds the rate at which sickle bar 17 can cut the standing crop, whereby crop is bent over and lost. Boost pressure of turbocharger engine 30 becomes a limiting factor when the load placed on engine 30 by the harvesting process exceeds the available horsepower from engine 30. Engine speed limits harvesting rates when engine 30 falls out of the governed range and begins to stall.

GROUND SPEED ERROR

Values of desired ground speed and boost pressure are selected, or set by the operator in cab 36 of combine 10 while the vehicle 10 is operating to optimize the harvesting process and are subjected as frequently as possible. Desired ground speed is set by the operator upon a potentiometer GSP of the ground speed setpoint circuit GSSP connected in series with two resistances R1 and R2 comprising a voltage divider between +8 volts and ground. Potentiometer GSP may be adjusted, for example, to derive setpoint voltages representative of ground speeds from 2 to 8 miles per hour. The selected ground speed setpoint signal, or value is applied to (1) the negative input of an operational amplifier comparator A3C of ground speed error detector circuit GSED and (2) the positive input of an operational amplifier comparator A3D of the ground speed error detector circuit.

It will be appreciated that the functions and results of the disclosed "hardwired" embodiment of the invention can also be accomplished by computer software wherein electrical "signals" and "voltages" per se may not exist, and consequently the terms "values" and "commands" are used interchangeably with the words "signals" and "voltages" in the detailed description and appended claims.

Comparators A3C and A3D receive the analog ground speed signal on their positive and negative inputs through resistances R3 and R10 respectively. When the ground speed signal exceeds the ground speed setpoint value, comparator A3C provides a "+" ground speed error signal, or value on its output which is coupled: (a) to the negative input of a comparator operational amplifier A1C of a wired-OR-circuit; and (b) through a diode D1 to the input of a bilateral switch A2B of an error summing circuit ES. As described hereinafter, wired-OR means comprised by comparators A1A and A1C sense whether ground speed or boost pressure are beyond their upper deadband limits or engine speed is below the lower limit of the governed range and, when one of said parameters is beyond such limit, the wired-OR means derives a "speed decrease" or "slower" command, or signal representative of the dominant parameter to lower the speed of combine 10. Two resistances R12 and R13 connected in series between +8 volts and ground form a voltage divider which generates a fixed voltage at their junction which establishes upper and lower limits of a ground speed error deadband and a boost pressure error deadband within which no changes are made in combine speed. The voltage derived at the junction of R12 and R13 is applied through a resistance R22 to the positive input of comparator A1A of the wired-OR means. As long as combine ground speed is close to the value selected by the combine operator on potentiometer GSP, the + combine ground speed error signal from the output of A3C applied to the negative input of wired-OR comparator A1C will be less than the voltage from R12, R13 applied to the positive input of A1C, i.e., will be below the upper limit of the ground speed error signal deadband, and A1C will not generate a speed decrease, or slower command on its output. When the + ground speed error signal from the output of A3C is greater than the predetermined voltage or the + input of A1C, the ground speed error signal is beyond its upper deadband limit, and A1C will change state and derive a speed decrease, or slower command, or signal which is transmitted through an inverting gate NOT 1 to a speed decrease gate NAND A5A to decrease the transmission drive ratio and ground speed as described hereinafter.

When the ground speed signal from GSI is less than the ground speed setpoint value from GSP, comparator A3D derives a "−" ground speed error value on its output which is applied: (a) through a resistance R4 to the positive input of an operational amplifier comparator A1D of a wired-AND circuit, and (b) through a resistance R18 to the input of a bilateral switch A2A of error summing circuit ES. As described hereinafter, wired-AND means comprised by comparators A1B and A1D senses when both boost pressure and ground speed are below the lower limits of their deadbands and in response thereto generates a speed increase, or faster command, or signal to propel combine 10 at greater forward speed.

BOOST PRESSURE ERROR

Desired boost pressure is selected, or set, by the combine operator upon a potentiometer BPS of boost pressure setpoint circuit BPSP connected in series with a resistance R30 and a potentiometer ESS between ground and the output of the engine speed detector circuit ESD. When potentiometer ESS is adjusted to provide +5.45 volts at the junction between potentiometers BSP and ESP, boost pressure setting potentiometer BPS may be adjusted by the combine operator to derive setpoint voltages representative of engine boost pressures from 10 to 25 pounds per square inch. The boost pressure setpoint signal from potentiometer BPS is coupled: (a) through a resistance R5 to the negative input of an operational amplifier comparator A3A of the boost pressure error detector circuit BPED, and (b) through a resistance R6 to the positive input of an operational amplifier comparator A3B of boost pressure error detector circuit BPED. The unidirectional signal from boost pressure input circuit BPI indicative of engine boost pressure is coupled: (a) through a resistance R7 to the positive input of comparator A3A; and (b) also through a resistance R8 to the negative input of comparator A3B. When the unidirectional boost pressure analog signal exceeds the boost pressure setpoint value, comparator A3A provides a "+" boost pressure error signal which is applied (a) to the negative input of operational amplifier comparator A1A of the wired-OR means; and (b) through a diode D2 to the input of a bilateral switch A2B of error summing circuit ES. When the boost pressure signal is less than the boost pressure setpoint value from potentiometer BPS, comparator A3B provides a "−" boost point error signal on its ouput which is applied: (a) through a resistance R9 to the positive input of an operational amplifier comparator A1B of the wired-AND means; and (b) through a resistance R11 to the input of bilateral switch A2A of error summing circuit ES.

ENGINE SPEED DETECTOR CIRCUIT

Comparator A3A also functions to generate an engine speed error signal and wired-OR comparator A1A receives such engine speed error signal and senses when engine speed is below the lower limit of its governed range and in response thereto generates a speed decrease, or slower command at its output to decrease the ratio of hydrostatic transmission 28. Input terminal p11 is coupled to the bus of a tachometer module of the combine on which a constant DC potential ES of +12 volts is maintained as long as the speed of engine 30 is within the governed range but which becomes modulated with a square wave pulse, as shown in dotted lines in FIG. 2, when engine 30 becomes excessively loaded and lugs down until its speed falls below the lower limit of the governed range. The engine speed signal on input terminal p11 is an input to engine speed detector circuit ESD and is coupled through a resistance R25 to the positive input of a voltage follower operational amplifier A1E whose output (a) is coupled back to its negative input so said output will follow the signal on its positive input without loading it down so that A1E acts as a unity gain amplifier, and (b) charges a capacitor C5 through a resistance R26 of an RC integrating circuit to derive a unidirectional voltage across C5. The voltage across capacitor C5 is coupled through a resistance R28 to the positive input of a comparator operational amplifier A1F which has +5.5 volts applied to its negative input through a resistance R29. The output of A1F is applied across the series arrangement of potentiometer ESS, the boost pressure setting potentiometer BPS, and a resistance R30 to ground. A1F compares the voltage across capacitor C5 to the +5.5 voltage supply, and when the speed of engine 30 is within its governed range so input terminal P11 sees constant +12 volts, engine speed potentiometer ESS is adjusted so that +5.45 volts exists at its lower terminal at the junction of potentiometers ESS and BPS.

If engine 30 becomes excessively overloaded so that it lugs down to the point where its speed is below the lower limit of its governed range, the signal at input terminal p11 becomes modulated with square wave pulses with the result that the voltage across capacitor C5 decreases and the output of comparator A1F falls so that zero voltage is impressed across boost pressure setpoint potentiometer BPS. The decrease of voltage across BPS to zero is equivalent to decrease to zero in the boost pressure setpoint voltage applied to the negative input of comparator A3A which, in response thereto, generates a large "+" engine speed error signal (which is analogous to a boost pressure error signal) at its output which is coupled to the negative input of wired-OR means comparator A1A. The predetermined voltage from voltage divider R12, R13 applied through resistance R22 to the positive input of A1A establishes the lower limit of the governed speed range of engine 30, and if the + engine speed error signal from A3A applied to the negative input of A1A exceeds the fixed voltage on its positive input, the output of A1A changes state and generates a "slower" signal, or command that is inverted by gate NOT 1 and applied to an input of speed decrease NAND gate A5A to effect a reduction in the drive ratio of transmission 28. The + engine speed error signal at the output of A3A is also coupled directly through a diode D2 to bilateral switch A2B of error summing circuit ES and causes rapid response of stepper motor 32 to the slower signal applied to gate A5A, as described hereinafter.

WIRE-OR CIRCUIT DERIVES SPEED DECREASE SIGNAL

The wired-OR means comprising comparators A1A and A1C having their outputs commoned detects whether ground speed or boost pressure exceed their upper deadband limit established by divider R12, R13 or whether engine speed is below the lower limit of its governed range and in response thereto generates a slower, or speed decrease command, or signal the duration of which is determined by the dominant error signal of the three which is sensed as the limiting capacity in the harvesting process. The outputs of comparators A1A and A1C are commoned and connected: (a) through inverting gate NOT 1 to one input of speed decrease NAND gate A5A; and (b) to a unidirectional voltage supply +8 volts through a resistance R14.

As discussed above, resistances R12 and R13 connected in series between +8 volts and ground form a voltage divider which generates a predetermined deadband establishing potential at their junction which is coupled: (a) through a resistance R22 to the positive input of comparator A1A; (b) to the negative input of comparator A1B; (c) through a resistance R23 to the positive input of comparator A1C; and (d) to the negative input of comparator A1D. When combine ground speed is close to the setpoint value set by the combine operator on GSP, the "+" ground speed error signal from A3C applied to the negative input of A1C is less than the predetermined voltage from voltage divider R12, R13 applied through R23 to its positive input so the output of A1C is high and thus the ground speed error signal is below its upper deadband limit and does not effect a change in the drive ratio of the hydrostatic transmission 28. However, when the + combine ground speed error signal from A3C exceeds the predetermined voltage from voltage divider R12, R13 applied through resistance R23 to the positive input of A1C, i.e., exceeds the upper limit of the deadband established by divider R12, R13 and resistance R23, the output of A1C changes state and changes the output of inverting gate NOT 1 to a logic 1 slower command which is applied to one input of speed decrease NAND gate A5A to decrease the transmission drive ratio.

Similarly, when boost pressure is close to the setpoint value set by the combine operator on BPS, the + boost pressure error signal from A3A applied to the negative input of A1A is less than the predetermined deadband establishing voltage from voltage divider R12, R13 applied through resistance R22 to its positive input, so the output of A1A is high and thus the + boost pressure error signal does not effect a change in the transmission drive ratio. However, when the + boost pressure error signal from A3A exceeds the voltage on the positive input of A1A, i.e., is beyond the upper limit of the boost pressure error signal deadband, A1A changes state and changes the output of inverting gate NOT 1 to a logic 1 speed decrease, or slower command that applied to one input of slower NAND gate A5A to decrease the transmission drive ratio.

When the output of slower NAND gate A5A is near zero, stepper motor 32 actuates the swash plate of hydrostatic transmission 28 in a direction to decrease combine speed and thus reduce the + ground speed error signal from A3C and to remove the null output signal from wired-OR comparator A1C. The length of time that the logic 1 slower command is applied to slower gate A5A is dependent upon whether the boost pressure error signal or the ground speed error signal or the engine speed error signal is dominant since the outputs of wired-OR comparators A1A and A1C are commoned. For example, if boost pressure would return to within the desired boost pressure deadband and engine speed was within its governed range while ground speed remained outside the ground speed deadband, the output of A1A would change state while the output of A1C would remain zero and continue to apply the slower command to NAND gate A5A until combine ground speed returned closer to the setpoint value.

WIRED-AND CIRCUIT DERIVES SPEED INCREASE COMMAND

Comparators A1B and A1D comprise wired-AND means for determining when both ground speed and boost pressure are beyond their lower deadband limits and for generating a speed increase, or faster command, or signal in response thereto for increasing speed of engine 30. Comparators A1B and A1D have their outputs commoned and together perform the logical AND function and also detect when both ground speed and boost pressure are beyond the corresponding lower deadband limit.

When the ground speed error and boost pressure error signals are within their deadbands, the outputs of wire-AND comparators A1B and A1D are at logic 0 voltage as a result of the positive bandwidth establishing voltage from divider R12, R13 applied to their negative inputs even though their commoned outputs are connected to a +8 V power supply through a resistance R15. The commoned outputs of A1B and A1D only derive a logic 1 voltage "faster" command when both comparators A1B and A1D have changed states.

When combine ground speed is less than the desired ground speed set by the combine operator on potentiometer GSP, the setpoint value applied to the positive input of comparator A3D is greater than the ground speed signal applied to its negative input, and A3D derives a "−" ground speed error signal of positive polarity on its output which is coupled through a resistance R4 to the positive input of comparator A1D of the wired-AND means and through a resistance R18 to bilateral switch A2A of error summing circuit ES. If such "−" ground speed error signal of positive polarity exceeds the deadband limit establishing voltage from voltage divider R12, R13 applied to the negative input of A1D, the output of A1D flips positive but is held at logic 0 voltage from the output of comparator A1B (unless the "−" boost pressure error signal is also below the lower limit of its deadband).

Similarly, when boost pressure of engine 30 is less than the desired boost pressure set by the combine operator on potentiometer BPS, the boost pressure setpoint value applied to the positive input of comparator A3B is greater than the boost pressure signal applied to the negative input of A3B, and A3B derives a "−" boost pressure error signal of positive polarity on its output which is applied through a resistance R9 to the positive input of comparator A1B of the wired-AND means and also through a resistance R11 to bilateral switch A2A of error summing circuit ES. If such "−" boost pressure error signal of positive polarity exceeds the deadband limit establishing voltage from voltage divider R12, R13 coupled to the negative input of A1B, the output of A1B flips positive and, assuming that the output of A1D is also positive, a logic 1 speed increase, or faster command is derived at the commoned outputs of A1B and A1D which is coupled to the input of closed bilateral switch A2C which connects such faster command to speed increase NAND gate A5B.

The gate of bilateral switch A2C is coupled to the output of wired-OR means A1A, A1C and through resistance R14 to a +8 volt power supply, so bilateral switch A2C is normally held closed to couple the faster command from wired-AND means A1B, A1D to speed increase NAND gate A5B as long as boost pressure and ground speed are within their deadbands and engine speed is within the governed range so the output of wired-OR means A1A-A1C is positive. When the output of wired-OR means A1A, A1C goes to zero, thereby indicating that ground speed or boost pressure is excessive or engine speed is below the lower limit of its governed range, the negative voltage applied to the gate of bilateral switch A2C opens it to remove the faster signal output of wired-AND means from NAND gate A5B, thereby preventing the simultaneous application of faster and slower signals to stepper motor windings 33F and 33S and assuring stable operation of the ground speed control.

RATE OF RESPONSE

The above described wired-OR means senses which of the three parameters of ground speed, boost pressure and engine speed is dominant and generates a speed decrease signal in response to such dominant signal. The ground speed control of the invention not only detects which parameter is dominant that it should respond to, but it also senses what the rate of response should be in order to again maximize the harvest cutting rate. The disclosed embodiment of the invention generates a rate-of-response signal which is a function of the largest of the error signals when the wired-OR means is operated and which is a function of the average of the error signals when the wired-AND means is operated. It will be appreciated that the rate of response should be greater to slow down the combine at a faster rate if a parameter such as boost pressure greatly exceeds the desired value selected by the operator than if it is only slightly beyond the deadband limit. The + and − ground speed error signals from A3C and A3D and the + and − boost pressure error signals from A3A and A3B are inputs to an error summing circuit ES which in response thereto generates a rate-of-response analog output value which is a function of the magnitudes of the error value inputs. Different weights are given to the different error signal inputs to error summing circuit ES. In the embodiment illustrated in FIGS. 1 and 2, the "+" error signals, which are indicative of excessive boost pressure and excessive ground speed and stalling of the engine and result in a speed decrease command, may necessitate rapid slowing down of combine 10 and are coupled directly to error summing circuit ES through diodes D1 and D2. The "−" error signals, which are indicative of low boost pressure and low ground speed and result in a speed increase command and permit slower change of combine speed, are coupled to error summing circuit ES through a voltage divider which applies the average of such "−" error signals to the error summing circuit. The "+" boost pressure and ground speed error signals from A3A and A3C and also the engine speed error signal from A3A are coupled directly through diodes D1 and D2 to the input of bilateral switch A2B. The "−" boost pressure and ground speed error signals from A3B and A3D are coupled through resistances R11 and R18 which are connected together as a voltage divider and their junction is connected to the input of bilateral switch A2A so the input of bilateral switch A2A sees the average of such "−" error values. The outputs of bilateral switches A2A and A2B are commoned so their output signals are additive and charge a noise removing capacitor C7 at the input of a voltage controlled oscillator VCO which may be an integrated circuit of the RC4151 type commercially available from Raytheon Company. Voltage controlled oscillator VCO provides square wave pulses at its output whose frequency is a function of the rate-of-response value generated by error summing circuit ES.

Bilateral switches A2A and A2B of error summing circuit ES are closed and open respectively when logic 1 and logic 0 (or null) signals are applied to their gates. When boost pressure, ground speed and engine speed parameters are within their deadbands; (1) the gate of switch A2B receives a null signal from the output of inverting gate NOT 1 so switch A2B is open; and (2) bilateral switch A2C is held closed by the logic 1 signal on its gate from the output of A1A and connects logic 0 voltage from the output of A1B to the gate of A2A. However, when one of the parameters becomes excessive and causes the output of wired-OR means A1A–A1C to change state, or go low; (a) the output of NOT 1 goes high to close switch A2B; and (b) a logic 0 signal is applied to the gate of switch A2C to open it so logic 0, or a null signal is applied to the gate of switch A2A to open it. Consequently, when the wired-OR means A1A, A1C operate, the input of voltage controlled oscillator VCO sees the highest voltage "+" boost pressure error signal or ground speed error signal or engine speed error signal coupled to the input of A2B through D1 or D2 since these diodes having their cathodes commoned pass the highest voltage and back bias the other diode. Consequently, the frequency of the square wave output pulses from VCO is proportional to the magnitude of the dominant + error signal as long as wired-OR A1A, A1C means is operated.

When both boost pressure and ground speed are below their lower deadband limit and cause the output of wired-AND means A1B, A1D to go high, closed switch A2C connects logic 1 voltage to the gate of bilateral switch A2A to close it while A2B remains open so the input of VCO sees the average of the "−" boost pressure and ground speed error signals from voltage divider R11, R18 and generates square wave output pulses at a frequency proportional to such average "−" error voltage signals. A response setpoint potentiometer RS connected through a resistance R35 to an input of voltage controlled oscillator VCO permits adjustment of the frequency range of its output pulses to compensate for differences in crops and in models of combines.

MANUAL OR AUTOMATIC MODE

The output pulses from voltage controlled oscillator VCO whose frequency is a function of the rate-of-response signal, or value generated by circuit ES are coupled through an auto/manual switch AUTO/MAN to one input of slower NAND gate A5A and to one input of faster NAND gate A5B. AUTO/MAN switch could be a bilateral switch whose input is coupled through an inverting gate NOT 6 from the output of VCO and whose gate receives an output signal from an auto/manual flip-flop latch comprising two NAND gates A5C and A5D interconnected as a flip-flop and each of which normally receives digital 1 voltage signal on one input from a +8 V power supply through resistances R36 and R37 respectively.

An operator request switch ORS has a movable contact connected to ground and which is normally maintained in a neutral position by spring means (not shown) and which is returned to such neutral position after the combine operator actuates it momentarily to manual position MAN or automatic position AUTO. Consequently, the output of the AUTO/MAN latch is normally logic 0 and the control is in the manual mode when the combine is initially energized. Assuming that the output of the AUTO/MAN latch is logic 1 indicating that the control is in the automatic mode and that switch ORS is operated to manual position, gate A5C receives a logic 0 signal on one input from the grounded movable contact so its output becomes logic 1 which is applied to one input of NAND gate A5D that is already receiving logic 1 voltage on its other input through R37, whereby the output from A5D and the AUTO/MAN latch applied to the gate of AUTO/MAN switch is logic 0 which opens such switch to block the variable frequency pulses from NAND gates A5C and A5D and thereby inhibit automatic operation of the control.

When the combine operator desires automatic operation, he momentarily depresses the operator request switch ORS which applies logic 0 voltage to one input of NAND gate A5D to convert its output to logic 1 voltage which is applied: (a) to one input of A5C to convert its output to logic 0 voltage and latch the auto/man flip-flop with logic 1 voltage output; and (b) to the gate of AUTO/MAN switch which closes it to apply the variable frequency pulses from VCO to: (a) one input of the speed decrease NAND gate A5A and; (b) one input of speed increase NAND gate A5B.

FASTER AND SLOWER GATES

When at least one of the ground speed, boost pressure or engine speed parameters is excessive, wired-OR means A1A, A1C provides a logic 0 voltage on its output which is converted by inverting gate NOT 1 to logic 1 and applied to one input of slower gate NAND A5A which receives the variable frequency pulses from VCO on its other input so that NAND gate A5A provides logic 0 output pulses at the frequency of the pulses from VCO. Such logic 0 output pulses from NAND gate A5A are inverted by a gate NOT 2 and amplified by a slower driver amplifier SDA whose amplified output pulses energize the decrease speed winding 33F of stepper motor 32 to actuate the swash plate of hydrostatic transmission 28 in a direction to decrease the transmission drive ratio and combine speed. When the combine slows down sufficiently so that all three parameters are within their deadband limits, the output of wired-OR means A1A, A1C goes high; the output of inverting gate NOT 1 becomes null which causes switch A5A to open and thus inhibit further pulses from oscillator VCO and to stop stepper motor 32.

When both ground speed and boost pressure are below their lower deadband limits, the output of wired-AND means A1B, A1D goes high which is connected through closed bilateral switch A2C to one input of faster NAND gate A5B which receives logical 1 voltage pulses from VCO on its other input. In response thereto A5B provides logic 0 output pulses at the frequency of the pulses from VCO which are connected by an inverting gate NOT 3 to logic 1 voltage pulses at the input of faster driver amplifier FDA. The amplified output pulses from amplifier FDA energize the increase speed winding 33F of stepper motor 32 to actuate the swash plate of hydrostatic transmission 28 in a direction to increase the transmission drive ratio and thus increase the ground speed of combine 10. When combine 10 speeds up sufficiently so that either boost pressure or ground speed is again within the corresponding deadband limits, the output of wired-AND means A1B, A1D flips to logic 0 voltage which is coupled through closed switch A2C, thereby removing the gate signal input from A5B to de-energize increase speed winding FDA and stop stepper motor 32.

The embodiments of the invention in which an exclusive property or privilege is claimed are defined as follows:

1. In a vehicle driven by an internal combustion engine, the combination of
means including first and second transducers for deriving speed and load signals which are functions respectively of the ground speed of said vehicle and the load on said engine, comparator means for generating speed error and load error values which are functions respectively of the differences between said speed and load signals and preset speed and load values, means for establishing speed error and load error deadbands having upper and lower limits on opposite sides of said preset speed and preset load values respectively, OR-means for identifying a single dominant controlling signal representing the limiting capacity in the vehicle as conditions change during operation thereof and for generating a speed decrease command in response to said dominant signal when a positive error value of one of said error values is beyond the upper limit of its deadband, AND-means for generating a speed increase command when a negative speed error value and a negative load error value are beyond the lower limits of said deadbands, error summing means for generating a rate-of-response value which is a function of the magnitudes of said speed error and load error values, means for modulating said speed decrease and said speed increase commands as a function of said rate of response value, and means for decreasing and for increasing the ground speed of said vehicle respectively in response to the modulated speed decrease and modulated speed increase commands.

2. In the combination of claim 1 wherein said vehicle is driven by said engine through a variable transmission and said ground speed increasing and decreasing means varies the drive ratio of said transmission.

3. In the combination of claim 2 and including speed setpoint and load setpoint potentiometer means on said vehicle adjustable by the vehicle operator for respectively generating said preset speed and preset load values which are indicative of desired vehicle ground speed and desired engine load.

4. In the combination of claim 2 or 3 wherein said OR-means includes first and second comparator operational amplifiers with commoned outputs which respectively receive said positive speed error value and said positive load error value on one input and a predetermined bandwidth establishing voltage on the other input.

5. In the combination of claim 4 wherein said AND-means includes third and fourth comparator operational amplifiers with commoned outputs which respectively receive said negative speed error value and said negative load error value on one input and said predetermined bandwidth establishing voltage on the other input.

6. In the combination of claim 5 wherein said AND-means generates said speed increase command when the outputs of both said third and fourth comparator operational amplifiers are of a polarity opposite to that to which they are biased by said bandwidth establishing voltage.

7. In the combination of claim 2 wherein said error summing means derives a rate-of-response value which is a function of the largest error value when said OR-means is operated and which is a function of the average of said error values when said AND-means is operated.

8. In an agricultural combine vehicle driven by an internal combustion engine through a variable transmission, the combination of means including first and second transducers for generating speed and load signals which are functions respectively of the ground speed of said vehicle and the load on said engine, speed setpoint and load setpoint potentiometer means on said vehicle adjustable by the vehicle operator for deriving setpoint signals indicative of desired vehicle ground speed and desired load on said engine, first and second adder means for deriving speed error and load error signals which are functions respectively of the differences between said speed and load signals and the corresponding setpoint signals, first comparator means receiving said speed error signal as an input for establishing a deadband for said speed error signal having upper and lower limits on opposite sides of said speed setpoint signal, second comparator means receiving said load error signal as an input for establishing a deadband for said load error signal having upper and lower limits on opposite sides of said load setpoint signal, OR-means for identifying a single dominant controlling signal representing the limiting capacity in the vehicle as conditions change during operation thereof and for deriving a speed decrease signal in response to said dominant signal when a positive error signal of one of said error signals is beyond the upper limit of its deadband, AND-means for deriving a speed increase signal when a negative speed error signal and a negative load error signal are beyond the lower limits of their deadbands, error summing means for generating a rate-of-response signal which is a function of the magnitudes of said speed error signal and said load error signal, means for modulating said speed decrease signal and said speed increase signal as a function of said rate-of-response signal, and means for decreasing and for increasing the drive ratio of said transmission respectively in response to the modulated speed decrease signal and the modulated speed increase signal.

9. In the combination of claim 3 or 8 wherein said engine is supercharged, said second transducer derives a load signal which is indicative of the boost pressure of said engine, and said load setpoint potentiometer means derives a load setpoint value indicative of desired boost pressure of said engine.

10. In the combination of claim 8 wherein said first comparator means includes first and second operational amplifiers which respectively receive said positive and said negative speed error signals as an input, and said second comparator means includes third and fourth operational amplifiers which respectively receive said positive and said negative load error signals as an input.

11. In the combination of claim 10 wherein said OR-means derives said speed decrease signal at the commoned outputs of said first and third operational amplifiers, and said AND-means derives said speed increase signal at the commoned outputs of said second and fourth operational amplifiers.

12. In the combination of claim 11 wherein said second and fourth operational amplifiers also receive inputs voltages which establish the widths of said load error signal and speed error signal deadbands and said AND-means derives said speed increase signal when the outputs of said second and fourth operational amplifiers are both of a polarity opposite to that to which they are biased by said deadband width establishing voltages.

13. In the combination of claim 8 or 11 and including means for deriving an engine speed signal which is a function of the speed of said engine,
means for generating an engine speed error signal when said engine speed signal falls below a predetermined voltage indicative of the lowest desired speed of said engine, the magnitude of said speed error signal being a function of the departure of said engine speed signal from said predetermined voltage, and wherein said OR-means also derives said speed decrease signal in response to said engine speed error signal.

14. In the combination of claim 13 wherein said engine speed signal is applied across said load setpoint potentiometer means and said second adder means also derives said engine speed error signal.

15. In the combination of claim 14 wherein said error summing means generates a rate-of-response signal which is a function of the largest of said error signals when said OR-means is operated and which is a function of the average of said error signals when said AND-means is operated.

16. In an agricultural combine driven by an internal combustion engine, in combination,
means including first and second transducers for deriving a speed signal and a load signal respectively which are functions of the ground speed of said combine and the load on said engine,
setpoint establishing means adjustable by the combine operator for generating speed and load setpoint signals which respectively are indicative of desired ground speed of said combine and desired load on said engine,
comparator means for deriving speed error and load error signals which are respectively functions of the differences between said speed and load signals and the corresponding setpoint signals,
OR-means for identifying a single dominant controlling signal representing the limiting capacity in the combine as condition change during operation thereof and for generating a speed decrease signal in response to said dominant signal when a positive error signal of one of said signals exceeds its predetermined magnitude,
AND-means for generating a speed increase signal when a negative speed error signal exceeds its said predetermined magnitude and a negative load error signal exceeds its said predetermined magnitude,
error summing means for generating a rate-of-response signal which is a function of the magnitudes of said speed error signal and said load error signal,
means for modulating said speed decrease signal and said speed increase signal as a function of said rate-of-response signal, and
means for decreasing and for increasing the ground speed of said combine respectively in response to the modulated speed decrease signal and the modulated speed increase signal.

17. In the combination of claim 16 and including means for establishing a deadband for said speed error signal whose upper and lower limits are on opposite sides of said speed setpoint signal and depart therefrom by its said predetermined magnitude,
means for establishing a deadband for said load error signal whose upper and lower limits are on opposite sides of said load setpoint signal and depart therefrom by its said predetermined magnitude, and wherein said OR-means and said AND-means do not generate said speed decrease and speed increase signals when said speed error and load error signals are within their corresponding upper and lower deadband limits.

18. In the combination of claim 17 wherein said combine is driven by said engine through a variable transmission and said ground speed decreasing and increasing means varies the drive ratio of said transmission.

19. In the combination of claim 18 wherein said engine is supercharged, said second transducer derives a load signal indicative of the boost pressure of said engine, and said setpoint establishing means generates a boost pressure setpoint signal indicative of the desired boost pressure of said engine.

20. In the combination of claim 8, 11 or 18 wherein said modulating means includes voltage controlled oscillator means for generating a train of pulses whose frequency is a function of the magnitude of said rate-of-response signal, and means for modulating said speed decrease signal and said speed increase signal in accordance with said train of pulses.

21. In the combination of claim 18 and including means for deriving an engine speed signal which is a function of the speed of said engine,
means for generating an engine speed error signal when said engine speed signal falls below a predetermined voltage indicative of the lowest desired speed of said engine, the magnitude of said speed error signal being a function of the departure of said engine speed signal from said predetermined voltage, and wherein said OR-means also generates said speed decrease signal in response to said engine speed error signal.

22. In the combination of claim 21 wherein said load set point establishing means includes a potentiometer adjustable by the combine operator, said engine speed signal is applied across said potentiomneter, and said comparator means derives said engine speed error signal when said engine speed signal is less than said predetermined voltage.

23. In a vehicle driven by an internal combustion engine, the combination of
a plurality of transducers for generating speed and load signals which respectively are functions of speed and load parameters of said engine,
means for deriving setpoint values indicative of desired values for said parameters,
comparator means for generating error values which are functions of the differences between said speed and load values and the corresponding setpoint values,
OR-means for identifying a single dominant controlling signal representing the limiting capacity in the vehicle as conditions change during operation thereof and for generating a speed decrease command in response to said dominant signal when a positive one of said error values exceeds a predetermined magnitude,
AND-means for generating a speed increase command when a plurality of negative error values exceed predetermined magnitudes, means for deriving a rate-of-response value which is a function of the magnitudes of said error values, means for modulating said speed decrease and speed increase commands as a function of said rate-of-response value, and means for decreasing and for increasing the ground speed of said vehicle respectively in response to the modulated speed decrease and modulated speed increase commands.

24. In the combination of claim 23 wherein said plurality of transducers derive signals which are functions of the ground speed of the vehicle and boost pressure and speed of said engine, and said AND-means generates said speed increase command when both the ground speed and boost pressure negative error values exceed said predetermined magnitudes.

25. In the combination of claim 24 wherein said error summing means generates a rate-of-response value which is proportional to the largest positive error value when said OR-means is operated and is proportional to the average of the boost pressure and ground speed negative error values when said AND-means is operated.

26. In the combination of claim 2, 3 or 23 wherein said modulating means includes voltage controller oscillator means for generating a train of pulses whose frequency is a function of the magnitude of said rate-of-response value, and means for modulating said speed decrease command and said speed increase command in accordance with said train of pulses.

* * * * *